United States Patent
Choi et al.

(10) Patent No.: US 12,090,556 B2
(45) Date of Patent: Sep. 17, 2024

(54) METHOD FOR PRODUCING SILVER POWDER WITH ADJUSTABLE SHRINKAGE

(71) Applicant: LS-NIKKO COPPER INC., Ulsan (KR)

(72) Inventors: Jae Won Choi, Busan (KR); Chang Gun Lee, Ulsan (KR); Mi Young Lee, Busan (KR); Woo Min Jin, Ulsan (KR); Tae Hoon Kang, Ulsan (KR); Young Hwan Kim, Gumi (KR)

(73) Assignee: LS MNM INC., Ulsan (KR)

( * ) Notice: Subject to any disclaimer, the term of this patent is extended or adjusted under 35 U.S.C. 154(b) by 527 days.

(21) Appl. No.: 17/298,437

(22) PCT Filed: Nov. 29, 2019

(86) PCT No.: PCT/KR2019/016807
§ 371 (c)(1),
(2) Date: May 28, 2021

(87) PCT Pub. No.: WO2020/111903
PCT Pub. Date: Jun. 4, 2020

(65) Prior Publication Data
US 2022/0023947 A1      Jan. 27, 2022

(30) Foreign Application Priority Data
Nov. 30, 2018    (KR) .......................... 10-2018-0153123

(51) Int. Cl.
*B22F 9/24*      (2006.01)
*H01B 1/02*      (2006.01)
*H01B 1/16*      (2006.01)

(52) U.S. Cl.
CPC .................. *B22F 9/24* (2013.01); *H01B 1/02* (2013.01); *H01B 1/16* (2013.01); *B22F 2203/11* (2013.01); *B22F 2301/255* (2013.01)

(58) Field of Classification Search
None
See application file for complete search history.

(56) References Cited

U.S. PATENT DOCUMENTS

| | | | |
|---|---|---|---|
| 2005/0257643 A1* | 11/2005 | Ogi .......................... | B22F 1/065 75/371 |
| 2017/0173698 A1* | 6/2017 | Gong ........................ | B22F 9/24 |
| 2017/0216913 A1* | 8/2017 | Tahara ...................... | C08K 9/04 |

FOREIGN PATENT DOCUMENTS

| | | | |
|---|---|---|---|
| WO | WO-2007105636 A1 | * | 9/2007 |
| WO | WO-2018070818 A1 | * | 4/2018 |
| WO | WO-2018080092 A1 | * | 5/2018 |

OTHER PUBLICATIONS

English translation of WO2007105636 (originally published Sep. 20, 2007), obtained from PE2E search.*

(Continued)

*Primary Examiner* — George Wyszomierski

(57) ABSTRACT

Disclosed is a silver powder preparation method including a silver salt reduction step. The silver salt reduction step includes a reaction solution preparation step for preparing a first reaction solution and a second reaction solution and a precipitation step for allowing reaction between the first reaction solution and the second reaction solution to precipitate silver particles. The first reaction solution contains silver ions, ammonia, an alkali metal salt of an organic acid, and a phosphorous compound, and the second reaction solution contains a reducing agent. The content of the phosphorous compound and the reaction temperature of the precipitation step are adjusted so that the shrinkage rate of the silver powder is adjusted within a range of 5% to 20% at 500° C. when the reaction temperature is heated to 800° C. at a heating rate of 50° C./min.

3 Claims, 1 Drawing Sheet

(56) References Cited

OTHER PUBLICATIONS

English translation of WO2018070818 (originally published Apr. 19, 2018), obtained from PE2E search.*
English translation of WO2018080092 (originally published May 3, 2018), obtained from PE2E search.*

* cited by examiner

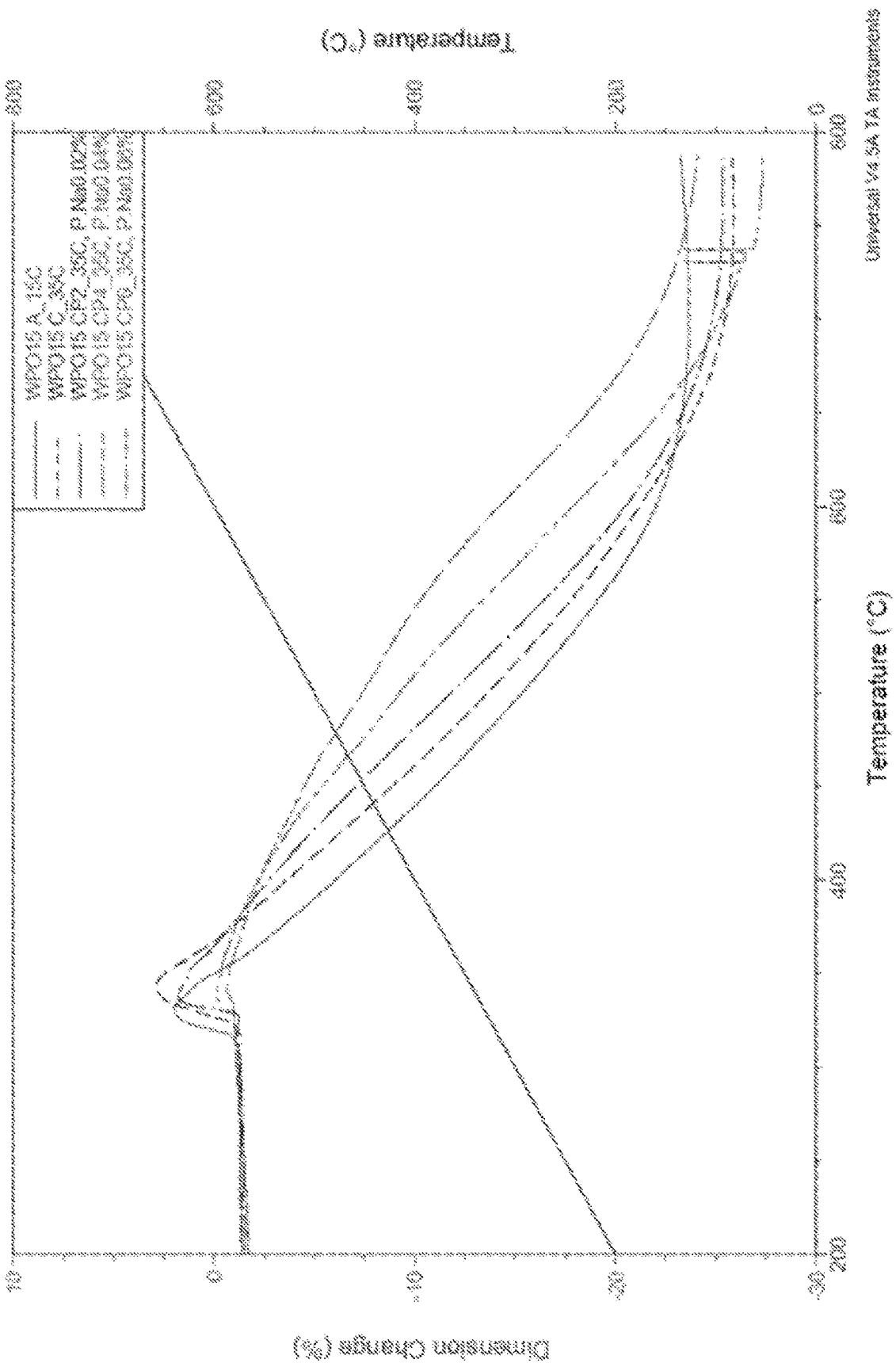

METHOD FOR PRODUCING SILVER POWDER WITH ADJUSTABLE SHRINKAGE

TECHNICAL FIELD

The present invention relates to a method of preparing a silver powder by easily controlling the shrinkage of the silver powder. More particularly, the present invention relates to a method of preparing a silver powder for a conductive paste that is used to form electrodes of electronic devices, such as an electrode of a solar cell, an internal electrode of a stacked capacitor, for used in formation of an electrode of a solar cell in an electronic component such as an electrode for a solar cell, an inner electrode of a multi-layer capacitor, or a conductive pattern of a printed circuit board.

BACKGROUND ART

A conductive paste is a paste that has applicability to coating and which allows electrical conduction through a dried film made therefrom. A conductive paste is a flowable composition obtained by dispersing conductive fillers (metal fillers) in a vehicle composed of a resin binder and a solvent and is widely used to form an electric circuit or an external electrode of a ceramic capacitor. After the fact that electric current flows through organic polymers was reported, research and development on conductive polymers have been actively conducted. However, since conductive polymers acquire conductivity based on a conjugated double bond structure, the conductive pastes have a problem in that they are difficult to dissolve in a solvent due to their rigid molecular chain and high crystallinity. Due to these points, it is difficult to manufacture a paste having applicability to coating.

Conductive pastes currently in practical use are categorized into resin curing type and sintered type. In the case of the resin curing type, conductive fillers are compressed by curing a resin at a low temperature of 200° C. or lower to enable electrical conduction. On the other hand, in the case of the sintered type, an organic vehicle volatilizes at high temperatures of 500 to 1200° C. to sinter conductive fillers so that electrical conduction can be achieved.

Among the two types, the sintered conductive paste is generally a flowable composition obtained by dispersing conductive fillers (metal fillers) in a vehicle composed of a resin binder and a solvent and is widely used for formation of an electric circuit or an external electrode of a ceramic capacitor.

On the other hand, when front electrodes of a solar cell are formed from the sintered conductive paste, a paste composed of a silver powder, a glass frit, an organic binder, and a solvent undergoes a sintering process performed at a specific temperature. The glass frit not only improves the sintering properties of the silver powder but also lowers electric resistance by preventing the island phenomenon between metals and by increasing the bonding force, thereby improving the electrical characteristics of the electrodes. In addition, the glass frit improves adhesion between a silver electrode and a substrate, thereby allowing stable electrodes to be formed.

A related art document (Korean Patent Application Publication No. 10-2014-7025084) discloses a method of preparing a silver powder that can be sintered at relatively low temperatures and has a particle size to similar to that of conventional silver powders. According to the document, ultrasonic cavitation is performed to prepare a silver powder composed of spherical silver particles in which closed pores are present.

However, in the method disclosed in the related art, only the sintering properties of the silver powder are considered. That is, the sintering properties of the glass frit are not considered in controlling the sintering properties of the silver powder.

(Patent Document 1) Korean Patent Application Publication No. 10-2014-0125418 (Oct. 28, 2014)

DISCLOSURE

Technical Problem

The present invention provides a method of preparing a silver powder being suitable for used in preparation of a high temperature sintered conductive paste that can be sintered at temperatures of 600° C. or higher, the method being capable of easily controlling the shrinkage of the silver powder. By the method of the present invention, a silver powder having a sintering property that is adaptively adjusted according to the sintering property of a glass frit which will be used in combination with the silver powder for a conductive paste can be easily obtained.

The objectives of the present invention are not limited to the one described above, and other objectives will be clearly understood by those skilled in the art from the following description.

Technical Solution

The present invention provides a method of preparing a silver powder. The method includes a silver salt reduction step S2. The silver salt reaction step S2 includes: a reaction solution preparation step S21 of preparing a first reaction solution containing silver ions, ammonia, an alkali metal salt of an organic acid, and a phosphorous compound and a second reaction solution containing a reducing agent; and a precipitation step S22 of causing reaction between the first solution and the second solution to obtain silver particles for the silver powder, in which the content of the phosphorous compound and the reaction temperature of the precipitation step are adjusted to control the sintering properties of the silver powder.

The phosphorus compound may be at least one selected from the group consisting of pyrophosphates including sodium pyrophosphate, phosphates including potassium phosphate, and metaphosphate.

In the reaction solution preparation step S21, the phosphorous compound may be added in a ratio of 0.02% to 0.06% by weight with respect to the total weight of the first reaction solution. In the precipitation step S22, the reaction temperature may be adjusted within a range of 15° C. and 35° C. to control the sintering properties of the silver powder.

In the precipitation step S22, the reaction temperature is increased within the range of 15° C. and 35° C. to lower the shrinkage rate of the silver powder.

In the reaction solution preparation step S21, the content of the phosphorous compound is increased within a range of 0.02% to 0.06% by weight with respect to the total weight of the first reaction solution to lower the shrinkage rate of the silver powder.

The silver powder prepared by the method may have a particle size of 0.5 to 3 µm and a shrinkage rate of 5% to 20% at 500° C. when the reaction temperature is increased to 800° C. at a heating rate of 50° C./min.

When preparing the silver powder for a conductive paste in which a glass frit having a fast sintering property is included, the reaction temperature of the precipitation step and the content of the phosphorous compound are adjusted so as to increase the shrinkage rate of the silver powder. On the other hand, when preparing the silver powder for a conductive paste in which a glass frit having a slow sintering property is included, the reaction temperature of the precipitation step and the content of the phosphorous compound are adjusted so as to reduce the shrinkage of the silver powder.

Advantageous Effects

According to the present invention, in the method of preparing a silver powder having an average particle size of 0.5 to 3 μm, the shrinkage rate of the silver powder at 500° C. is adjusted to be in a range of 5% to 20% when being heated to 800° C. at a heating rate of 50° C. by adjusting the reaction temperature and the content of the phosphorous compound. When solar cell electrodes are formed from a conductive paste including the silver powder, the required shrinkage rate of the silver powder can be easily adjusted according to the sintering property of the glass frit included in the conductive paste.

DESCRIPTION OF DRAWINGS

FIG. 1 is a graph illustrating change in contraction rate of each of conductive pastes according to examples of the present invention and comparative examples.

BEST MODE

Prior to a description of the present invention, it should be noted that the terms used in the present specification are used only to describe specific examples and are not intended to limit the scope of the present invention which will be defined only by the appended claims. Unless otherwise defined herein, all terms including technical and scientific terms used herein have the same meaning as commonly understood by those who are ordinarily skilled in the art to which this invention pertains.

Unless otherwise stated herein, it will be further understood that the terms "comprise", "comprises", and "comprising", when used in this specification, specify the presence of stated features, regions, integers, steps, operations, elements and/or components but do not preclude the presence or addition of one or more other features, regions, integers, steps, operations, elements, components and/or groups thereof.

All or some embodiments described herein may be selectively combined and configured so that the embodiments may be modified in various ways unless the context clearly indicates otherwise. Features that are specifically advised to be desirable or preferable may be combined with any other features that are advised to be desirable or preferable. Hereinafter, preferred embodiments of the present invention will be described in detail with reference to the accompanying drawings.

According to one exemplary embodiment of the present invention, there is provided a method of preparing a silver powder having an average particle size of 0.5 to 3 μm. In the method, the reaction temperature and the amount of a phosphorus compound that is added are controlled so that the contraction rate of the silver powder is adjustable in a range of 5% to 20% in a period of heating to 800° C. when the reaction temperature is heated at a heating rate of 50° C./min up to 800° C.

The silver power preparation method according to one embodiment of the present invention includes a silver salt preparation step S1; a silver salt reduction step S2; a purification step S3 including filtration and washing; and a surface treatment step S4. The silver power preparation method according to the present invention essentially includes the silver salt reduction step S2 and may optionally include the other steps.

1. Silver Salt Preparation Step S1

In the silver salt preparation step S1 according to one embodiment of the present invention, a silver salt solution containing silver ions ($Ag^+$) is prepared by treating silver in the form of ingots or granules with an acid. The silver powder can be directly prepared through this step. Alternatively, the subsequent steps may be performed using a commercially available silver nitrate, silver salt complex, or silver intermediate solution without using this step.

2. Silver Salt Reduction Step S2

The silver salt reduction step S2 according to one embodiment of the present invention is a step of reducing the silver ions by adding a reducing agent and ammonia to the silver salt solution, thereby causing precipitation of silver particles. This step S2 includes: a reaction solution preparation step S21 of preparing a first reaction solution containing silver ions, ammonia, an alkali metal salt of an organic acid, and a phosphorus compound and a second reaction solution containing a reducing agent; and a precipitation step S22 of obtaining silver particles by causing the first reaction solution and the second reaction solution to reach with each other.

The reaction solution preparation step S21 according to one embodiment of the present invention is a step of preparing the first reaction solution by adding ammonia, an organic acid alkali metal salt, and a phosphorous compound to the silver salt solution containing silver ions and stirring the resulting solution to dissolve the added substances. Among the added substances, the ammonia functions to adjust pH of the solution, the alkali metal salt of an organic acid functions to control crystallinity, and the phosphorous compound functions to adjust the sintering properties of the silver powder.

The silver ions are not limited to a specific form as long as the silver ions are cations. Examples of the silver ion include nitric acid ($AgNO_3$), silver salt complex, and silver intermediate. Hereinafter, the contents of other components will be described based on 120 g of silver nitrate ($AgNO_3$).

In the present invention, by adding an alkali metal salt of an organic acid to the first reaction solution and adjusting the pH of the solution with ammonia, it is possible to prepare, as a finished product, a silver powder that starts sintering at a low temperature, shrinks at a high rate in a specific temperature range, and exhibits a high final shrinkage rate.

The alkali metal salt of an organic acid is added in an amount of 20 to 30 g to 120 g of silver nitrate ($AgNO_3$). The alkali metal salt of an organic acid is a salt made from one or more metals and one or more organic acids (shot chain fatty acids). The organic acid is selected from the group consisting of acetic acid ($CH_3COOH$), formic acid ($CH_2O_2$), oxalic acid ($C_2H_2O_4$), lactic acid ($C_3H_6O_3$), citric acid ($C_6H_8O_7$), fumaric acid ($C_4H_4O_4$), citric acid ($C_6H_8O_7$), butyric acid ($C_4H_8O_2$), propionic acid ($CH_3CH_2COOH$), and uric acid ($CH_3CH_2COOH$). The metal is selected from the group consisting of lithium (Li), sodium (Na), potassium (K), calcium (Ca), and magnesium (Mg). Preferably, as the alkali metal salt of an organic acid, one or more salts are selected from the group consisting of potassium acetate ($CH_3COOK$), potassium format(HCOOK), and potassium oxalate ($C_2K_2O_4$).

Ammonia (($NH_3$) is used in the form of an aqueous solution. For example, a 25% ammonia aqueous solution is used, 150 to 250 mL of the solution is added to 120 g of nitric acid ($AgNO_3$). When ammonia is added in an amount more than 250 ml, the effect of reduction of thermal shrinkage is not sufficient. On the other hand, when ammonia is added in an amount less than 150 ml, there is a problem in that the particles of the finished powder are small and angular. The ammonia includes its derivatives. With the use of the ammonia, the pH condition for the reduction reaction occurring in the precipitation step S22 is adjusted to a pH range of 8 to 11.

The present invention can easily control the sintering properties of the produced silver by adding a phosphorous compound to the first reaction and adjusting the reaction temperature and the amount of addition of the phosphorous compound. When the silver powder that is produced by the present invention is used as a conductive paste for solar cell electrodes, the effect of controlling the sintering properties of a sintered-type paste is significantly meaningful in the sense of technology.

The components, such as $Al_2O_3$, $ZrO_2$, ZnO, or $Li_2O$, included in the glass frit included in a conductive paste for solar cell electrodes functions to form a stable glass phase and to maintain a low viscosity when an interfacial reaction occurs. When a glass component has a low viscosity during the interfacial reaction, since the probability of contact between PbO and an antireflective film is increased, etching may occur over a larger area. When etching occurs over a large area, the area of the front electrode formed through recrystallization of silver is also increased, so the contact resistance between a substrate and a front electrode is reduced compared to conventional technology, and the contact strength between the substrate and the front electrode is improved.

The present invention can ultimately improve the efficiency of solar cells by providing a silver powder having adequate shrinkage that is adaptively adjusted according to the sintering properties of glass frit included in a conductive paste for solar cell electrodes. More specifically, when a glass frit having a fast sintering property is used, it is preferable that the shrinkage rate of the silver powder is high. On the other, when a glass frit having a slow sintering property is used, it is preferable that shrinkage rate of the silver powder is low. Therefore, a silver powder and a glass frit having a fast sintering property are included in a conductive paste, the silver powder is prepared to have a high shrinkage rate. On the other hand, when a silver powder and a glass frit having a low sintering property are included in a conductive paste, the silver power is prepared to have a low shrinkage rate.

The present invention has the advantage of easily preparing a silver powder having a required shrinkage rate by controlling the content of the phosphorous compound in the first reaction solution and the reaction temperature for the reaction between the first reaction solution and the second reaction solution.

The phosphorus compound is at least one selected from the group consisting of pyrophosphates including sodium pyrophosphate, phosphates including potassium phosphate, and metaphosphate. Preferably, sodium pyrophosphate or sodium phosphate is added to control the sintering properties.

The phosphorous compound is added in a ratio of 0.02% to 0.06% by weight based on the total weight of the first reaction solution to control the sintering properties of the silver powder. When the content of the phosphorous compound is increased within the range, the shrinkage of the silver powder that is produced can be reduced. Conversely, when the content of the phosphorous compound is reduced within the range, the shrinkage can be increased. When the content of the phosphorous compound is lower than 0.02% by weight, the sintering is excessively fast, resulting in a high shrinkage rate. On the other hand, when the content of the phosphorous compound is higher than 0.06% by weight, the sintering is not slowed. Therefore, it is not meaningful to add the phosphorous compound in a content ratio higher than 0.06%. A more specific method of controlling the sintered properties will be described along with a description of the method of adjusting the reaction temperature of the precipitation step S22.

The first reaction solution containing silver ions, ammonia, organic acid alkali metal salt and phosphorus compound may be prepared in the form of an aqueous solution by adding silver ions, ammonia, organic acid alkali metal salt, and phosphorus compound to a solvent such as water and dissolving the added substances in the solvent through stirring. Alternatively, the first reaction solution may be prepared in the form of slurry.

The reaction solution preparation step S21 according to one embodiment of the present invention is to prepare the second reaction solution containing a reducing agent.

As the reducing agent, one or more substances selected from the group consisting of ascorbic acid, alkanolamine, hydroquinone, hydrazine, and formalin. Among them, preferably, hydroquinone is used. The reducing agent is preferably included in an amount of 20 to 40 g with respect to 120 g of silver nitrate ($AgNO_3$) included in the first reaction solution. When the amount of the reducing agent is less than 20 g with respect to 120 g of silver nitrate, not all of the silver ions are reduced. When the amount is more than 40 g, the organic content may increase, thereby causing a problem.

The second reaction solution containing the reducing agent may be prepared into an aqueous solution by adding the reducing agent to a solvent such as water and dissolving the reducing agent through stirring.

The precipitation step S22 according to one embodiment of the present invention is a step of causing reaction between the first reaction solution and the second reaction solution to obtain a silver powder. In a state in which the first reaction solution prepared by the reaction solution preparation step S21 is being stirred, the second reaction solution is added little by little or in a batched manner to the first reaction solution. Preferably, the batch process is used because the reduction reaction can be completed in a short time, thereby preventing agglomeration of particles and improving dispersibility.

In the precipitation step S22, the reaction temperature is adjusted to a range of 15° C. and 35° C. to control the sintering properties of the silver powder. When the reaction temperature is increased within the range, the shrinkage of the silver powder is decreased. Conversely, when the reaction temperature is reduced within the range, the shrinkage is increased. When the reduction reaction occurs at below 15° C., the reaction is too slow. On the other hand, when the reduction reaction occurs at above 35° C., the reaction is excessively fast, resulting in increases in organic materials and surface roughness.

More specifically, when the first reaction solution does not include a phosphorous compound, and the shrinkage is $S_1(\%)$ at a reaction temperature is $t_1(° C.)$ that is within the range described above, the reaction temperature is raised to $t_2(° C.)$ within the range so that the shrinkage will be reduced to $S_2(\%)$ that is 1% to 5% lower than $S_1(\%)$. When further reducing the shrinkage, the reaction temperature is fixed to $t_1(° C.)$ or $t_2(° C.)$, and the first reaction solution containing a phosphorous compound in a content of $P_1(\%$ by weight) is used. In this case, the shrinkage $S_3$ (%) is 1% to 6% lower than $S_1(\%)$ or $S_2$ (%).

On the other hand, in the embodiment of the present invention, in order to improve the dispersibility of silver particles and prevent agglomeration, a dispersant may be additionally included in the reaction solution, without departing from the scope of the invention. Examples of the dispersant include fatty acids, fatty acid salts, surfactants, organic metals, chelating agents, and protective colloid.

However, when the dispersant is added, there is a problem in that the content of residual organic substances increases. Therefore, it is preferable to control the particle size, the content of residual organic substances, and the diameter of crystallite without adding a dispersant.

3. Purification Step S3

The purification step S3 according to one embodiment of the present invention includes step S31 of separating silver particles dispersed in an aqueous solution or slurry and washing the silver particles after the precipitation of silver particles is performed through the silver salt reduction step S2. More specifically, the silver particles in the dispersant are settled, the supernatant of the dispersant is discarded, the remainder is filtered with a centrifuge, and a filter is washed with pure water. The washing process is not finished until the washing water is completely removed. Therefore, the moisture content is reduced to less than 10%. Optionally, the dispersant is added to a solution resulting from the reaction before the filtration to prevent agglomeration of silver particles.

In addition, the purification step S3 according to one embodiment of the present invention may further include a drying and disintegration step S34 performed after the washing.

4. Surface Treatment Step S4

Surface treatment step S4 according to one embodiment of the present invention is a step of hydrophobicizing the hydrophilic surface of the silver particles, and this step is optionally performed. More specifically, the water content of a wet cake obtained through the filtration is adjusted to be lower than 10%, a surface treatment agent is added to treat the surface of each silver particles, and the water content is adjusted to 70% to 85%. After that, the drying and disintegration process is performed to produce a powder. When the silver particles are surface-treated, it is required that the silver particles are well dispersed for sufficient surface treatment. In addition, it is preferable to perform the surface treatment in a state in which a predetermined water content is ensured because a low water content results in a low dispersion efficiency.

The silver powder preparation method according to the present invention is a method of preparing a silver powder having an average particle size of 0.5 to 3 μm. By controlling the reaction temperature and adding a phosphorus compound, the shrinkage of the silver powder at 500° C. is easily adjusted within a range of 5% to 20% under conditions in which the reaction temperature is increased to 800° C. at a heating rate of 50° C./min. In addition, it is possible to improve the efficiency when the front electrodes of solar cells are formed from a conductive paste containing the silver powder prepared according to the present invention.

The present invention also provides a conductive paste containing the silver powder prepared according to one embodiment of the present invention. More specifically, the conductive paste according to the present invention includes a metal powder, a glass frit, and an organic vehicle.

The metal powder includes the silver powder prepared according to the present invention, in which the sintering properties of the silver powder are suitably adjusted according to the properties of the glass frit included in the conductive paste.

The content of the metal powder is preferably in a range of 85% to 95% by weight based on the total weight of the conductive paste, given the electrode thickness and the wiring resistance of the electrode that is formed through printing.

There are no special restrictions on the composition, particle size, or shape of the glass frit. Lead-free glass frit as well as classical Pb-based glass frit can be used. Preferably, PbO, $TeO_2$, $Bi_2O_3$, $SiO_2$, $B_2O_3$, an alkaline metal such as Li, Na, or K, and an alkali earth metal such as Ca or Mg may be included. By organically combining the components, it is possible to prevent an increase in the line width of electrodes, to lower contact resistance at a position with a high sheet resistance, and to reduce a short-circuit current.

The average particle size of the glass frit is not particularly limited but is preferably in a range of 0.5 to 10 μm. Alternatively, the glass frit may be a mixture of several types having different average particle sizes. Preferably, at least one type of glass frit has an average particle size (D50) that is within a range of 2 to 10 μm. In this case, it is possible to improve the reaction characteristics during the sintering process, to minimize to damages to multiple (e.g., n) layers at high temperatures, to improve a binding force, and to increase the open circuit voltage Voc. In addition, it is possible to reduce an increase in the line width of the electrodes during the sintering.

The content of the glass frit is preferably in a range of 1% to 5% by weight based on the total weight of the composition of the conductive paste. When the content is lower than 1% by weight, there is a risk of incomplete sintering which will result in an increase in electrical resistivity. Conversely, when the content is higher than 5% by weight, there is a concern that the electrical resistivity increases due to an excessive amount of a glass component in a sintered material.

The organic vehicle is not particularly limited but may include an organic binder and a solvent. In some cases, a solvent may be no included in the organic vehicle. The content of the organic vehicle is not particularly limited but is preferably in a range of 1% to 10% by weight based on the total weight of the conductive paste.

The organic vehicle is required to maintain a state in which the metal powder and the glass frit are homogeneously mixed. For example, the components of the conductive paste composition need to be homogeneously mixed to prevent blurry printed patterns and paste sagging when a conductive paste is applied to the surface of a substrate by screen printing. In addition, the homogeneously mixed state improves the discharge property and separation property of the conductive paste from a screen plate.

The organic binder included in the organic vehicle is not particularly limited, but it may be a cellulose ester compound, a cellulose ether compound, an acrylic compound, or a vinyl compound. Examples of the cellulose ester compound include cellulose acetate and cellulose acetate butyrate. Examples of the cellulose ether compound include ethyl cellulose, methyl cellulose, hydroxypropyl cellulose, hydroxyethyl cellulose, hydroxypropyl methyl cellulose, and hydroxyethyl methyl cellulose. Examples of the acrylic compound include polyacrylamide, polymethacrylate, polymethylmethacrylate, and polyethylmethacrylate. Examples of the vinyl compound include polyvinylbutyral, polyvinyl acetate, and polyvinyl alcohol. The organic binder is composed of one or more compounds selected from among the compounds listed above.

A solvent used to dilute the composition includes one or more compounds selected from the group consisting of alpha-terpineol, taxanol, dioctyl phthalate, dibutyl phthalate, cyclohexane, hexane, toluene, benzyl alcohol, dioxane, diethylene glycol, ethylene glycol mono butyl ether, ethylene glycol mono butyl ether acetate, diethylene glycol mono butyl ether, diethylene glycol mono butyl ether acetate.

The conductive paste composition according to the present invention may optionally include commonly known additives as necessary. Examples of the additives include a dispersant, a plasticizer, a viscosity modifier, a surfactant, an oxidizer, a metal oxide, and a metal organic compound.

The present invention provides a method of manufacturing a solar cell electrode, the method including: applying the conductive paste to a substrate; and drying and sintering the conductive paste. In addition, the present invention provides a solar cell electrode manufactured by the method. Except for the use of the conductive paste containing the silver powder having the characteristics described above, the method of forming a solar cell electrode, according to the present invention, uses a substrate, a printing process, and a drying process that have been commonly used to manufacture a conventional solar cell. For example, the substrate may be a silicon wafer.

EXAMPLES AND COMPARATIVE EXAMPLES (1) Example 1

To 720 g of pure water having room temperature, 120 g of silver nitrate, 190 ml of ammonia (25% concentration), and 22 g of oxalic acid were added and stirred to dissolve to prepare a first reaction solution. To 1000 g of pure water having room temperature, 30 g of hydroquinone was added and stirred to dissolve to prepare a second reaction solution. After the reaction temperature was adjusted to 15° C., the second reaction solution was added in a batched manner to the first reaction solution being continuously stirred. The mixture was stirred for 10 minutes after the second solution was added so that particles are generated and grown. After that, the stirring was stopped to allow the particles settle. Next, the supernatant of the mixture was discarded, the remainder including the particles was filtered, and a filter was washed with pure water.

(2) Example 2

To 720 g of pure water having room temperature, 120 g of silver nitrate, 190 ml of ammonia (25% concentration), and 22 g of oxalic acid were added and stirred to dissolve to prepare a first reaction solution. To 1000 g of pure water having room temperature, 30 g of hydroquinone was added and stirred to dissolve to prepare a second reaction solution. After the reaction temperature was adjusted to 35° C., the second reaction solution was added in a batched manner to the first reaction solution being continuously stirred. The mixture was stirred for 10 minutes after the second solution was added so that particles are generated and grown. After that, the stirring was stopped to allow the particles settle. Next, the supernatant of the mixture was discarded, the remainder including the particles was filtered, and a filter was washed with pure water.

(3) Example 3

To 720 g of pure water having room temperature, 120 g of silver nitrate, 190 ml of ammonia (25% concentration), 22 g of oxalic acid were added, and sodium pyrophosphate in an amount corresponding to 0.02% by weight were added and stirred to dissolve to prepare a first reaction solution. To 1000 g of pure water having room temperature, 30 g of hydroquinone was added and stirred to dissolve to prepare a second reaction solution. After the reaction temperature was adjusted to 35° C., the second reaction solution was added in a batched manner to the first reaction solution being continuously stirred. The mixture was stirred for 10 minutes after the second solution was added so that particles are generated and grown. After that, the stirring was stopped to allow the particles settle. Next, the supernatant of the mixture was discarded, the remainder including the particles was filtered, and a filter was washed with pure water.

(4) Example 4

To 720 g of pure water having room temperature, 120 g of silver nitrate, 190 ml of ammonia (25% concentration), 22 g of oxalic acid were added, and sodium pyrophosphate in an amount corresponding to 0.04% by weight were added and stirred to dissolve to prepare a first reaction solution. To 1000 g of pure water having room temperature, 30 g of hydroquinone was added and stirred to dissolve to prepare a second reaction solution. After the reaction temperature was adjusted to 35° C., the second reaction solution was added in a batched manner to the first reaction solution being continuously stirred. The mixture was stirred for 10 minutes after the second solution was added so that particles are generated and grown. After that, the stirring was stopped to allow the particles settle. Next, the supernatant of the mixture was discarded, the remainder including the particles was filtered, and a filter was washed with pure water.

(5) Example 5

To 720 g of pure water having room temperature, 120 g of silver nitrate, 190 ml of ammonia (25% concentration), 22 g of oxalic acid were added, and sodium pyrophosphate in an amount corresponding to 0.06% by weight were added and stirred to dissolve to prepare a first reaction solution. To 1000 g of pure water having room temperature, 30 g of hydroquinone was added and stirred to dissolve to prepare a second reaction solution. After the reaction temperature was adjusted to 35° C., the second reaction solution was added in a batched manner to the first reaction solution being continuously stirred. The mixture was stirred for 10 minutes after the second solution was added so that particles are generated and grown. After that, the stirring was stopped to allow the particles settle. Next, the supernatant of the mixture was discarded, the remainder including the particles was filtered, and a filter was washed with pure water.

TABLE 1

| | First reaction solution | | | | | |
|---|---|---|---|---|---|---|
| | Reaction temperature (° C.) | Pure water(g) | Siler nitride(g) | Ammonia (ml) | Oxalic acid (g) | Sodium pyrophosphate (wt %) |
| Example 1 | 15 | 720 | 120 | 190 | 22 | — |
| Example 2 | 35 | 720 | 120 | 190 | 22 | — |
| Example 3 | 35 | 720 | 120 | 190 | 22 | 0.02 |
| Example 4 | 35 | 720 | 120 | 190 | 22 | 0.04 |
| Example 5 | 35 | 720 | 120 | 190 | 22 | 0.06 |

Test Example 1: SEM Size Measurement

With respect to each of the silver powders prepared according to the examples, the diameters of 100 particles were measured using a scanning electron microscope (SEM) manufactured by JEOL, and then the average particle size was calculated as a SEM size (μm). The results are shown in Table 2 below.

(2) Thermogravimetric Analyzer (TMA)

To evaluate the sintering properties and conductivity of the silver powders according to the examples of the present invention, 87 g of each of the silver powders prepared according to the examples, 1 g of 101 ethyl cellulose resin (STD200), and 12 g of an organic solvent (diethylene glycol monoethyl ether acetate) were mixed, and then the mixture was kneaded with a 3-roll mill to prepare a paste.

When the prepared paste was coated on an alumina substrate in an area of 200 μm and was heated to reach a temperature of 800° C. at a heating rate of 50° C./min. During the heating, the shrinkage (%) at 500° C. was measured. The results are shown in FIG. 1 and Table 2.

TABLE 2

| | SEM size(μm) | Shrinkage (%) |
|---|---|---|
| Example 1 | 1.10 | 15.5 |
| Example 2 | 1.25 | 13.5 |
| Example 3 | 1.23 | 12 |
| Example 4 | 1.20 | 8.5 |
| Example 5 | 1.20 | 7.5 |

As shown in FIG. 2 and Table 2, when the reaction was performed using the first reaction solution that did not contain a phosphorus compound, a first shrinkage rate $S_1$ measured when the reaction temperature was set to 15° C. (Example 1) was about 15.5%. When the reaction temperature was increased by 20° C. to 35° C. (Example 2), a second shrinkage rate $S_2$ was measured to be about 13.5% which was 2% lower than the first shrinkage rate $S_1$. Here, a third shrinkage rate $S_3$ measured under conditions in which the reaction temperature was fixed at 35° C. and the reaction was performed using the first reaction solution to which 0.02% by weight of a phosphorus compound was added (Example 3) was about 12'% which was 1.5% lower than the second shrinkage rate $S_2$. In addition, when the reaction was performed with the first reaction solution to which 0.04% by weight of a phosphorus compound was added (Example 4), a fourth shrinkage rate $S_4$ was measured to be about 8.5% which is 5% lower than the second shrinkage rate $S_2$. When the first reaction solution to which 0.06% by weight of the phosphorus compound was added was used, a fifth shrinkage rate $S_5$ was measured to be about 7.5% which was 6% lower than the second shrinkage rate $S_2$.

(3) Measurement of Resistance and Conversion Efficiency of Conductive Paste for Solar Cell Electrode.

Several glass frit compositions that differ in sintering speed were prepared by varying the contents of the respective components for glass frit. Specifically, the content of lead (Pb) was adjusted. The lower the Tg, the faster the sintering speed.

A glass frit, an organic binder, a solvent, and a dispersant were added in the respective contents shown in Table 4, the mixture was dispersed with a 3-roll mill, and then silver powder was added thereto and dispersed with a 3-roll mill. Next, degassing was performed under reduced pressure to prepare a conductive paste.

TABLE 3

| | PbO | $SiO_2$ | ZnO | CaO | $Al_2O_3$ | $B_2O_3$ | Tg (° C.) |
|---|---|---|---|---|---|---|---|
| G/F-A | 42.4 | 29.5 | 2.9 | 3.9 | 7.6 | 13.7 | 545 |
| G/F-B | 53.1 | 21.3 | 2.7 | 3.1 | 6.1 | 13.7 | 480 |
| G/F-C | 66.7 | 18.4 | 2.7 | — | 4.3 | 7.9 | 395 |
| G/F-E | 74.6 | 14.7 | — | — | 2.0 | 8.7 | 320 |
| G/F-E | 79.0 | 11.8 | — | 3.2 | — | 6 | 275 |

TABLE 4

| | Silver powder (g) | Glass frit (g) | Binder (g) | Solvent (g) | Dispersant (g) |
|---|---|---|---|---|---|
| Test Example 1 | 85 (Example 1) | 5(G/F-E) | 2 | 7 | 1 |
| Test Example 2 | 85 (Example 2) | 5(G/F-D) | 2 | 7 | 1 |
| Test Example 3 | 85 (Example 3) | 5(G/F-C) | 2 | 7 | 1 |
| Test Example 4 | 85 (Example 4) | 5(G/F-B) | 2 | 7 | 1 |
| Test Example 5 | 85 (Example 5) | 5(G/F-A) | 2 | 7 | 1 |
| Comparative Test Example 1 | 85 (Example 1) | 5(G/F-A) | 2 | 7 | 1 |
| Comparative Test Example 2 | 85 (Example 5) | 5(G/F-E) | 2 | 7 | 1 |

TABLE 5

| | Eff(%) | Rs(ohm) |
|---|---|---|
| Test Example 1 | 19.887 | 0.00142 |
| Test Example 2 | 19.913 | 0.00126 |
| Test Example 3 | 19.926 | 0.00121 |
| Test Example 4 | 19.854 | 0.00137 |
| Test Example 5 | 19.891 | 0.00130 |
| Comparative Test Example 1 | 19.628 | 0.00211 |
| Comparative Test Example 2 | 19.594 | 0.00173 |

As shown in Table 5, when the silver powders prepared according to the present invention are adaptively selected according to the sintering properties of the glass frit, the electrical resistance and conversion efficiency of the conductive powder can be controlled. More specifically, when a glass frit having a high sintering rate is used, a silver powder having a high shrinkage rate was used for preparation of a conductive phase while when a glass frit having a slow sintering rate, a silver powder having a low shrinkage rate was used. In these cases, referring to the results of Test Examples 1 to 5, the resistance was 0.00150 ohm or lower and the conversion efficiency was as high as 19.800% or more. In contrast, a combination of a glass frit having a fast sintering rate and a silver powder having a low shrinkage rate or a combination of a glass frit having a slow sintering rate and a silver powder having a high shrinkage rate was used (refer to Comparative Test Examples 1 and 2), the resistance was 0.00170 ohm or more and the conversion efficiency was as low as 19.700% or less.

The features, structures, effects, etc. of each of the implementation examples described above may be combined with those of other implementation examples by those skilled in the art so that the illustrated implementation examples may be used in modified forms. Therefore, the contents relating to this combination and modification should be construed to fall within the scope of the present invention.

The invention claimed is:

1. A silver powder preparation method comprising a silver salt reduction step comprising:
   a reaction solution preparation step of preparing a first reaction solution containing silver ions, ammonia, an alkali metal salt of an organic acid, and a phosphorous compound, and a second reaction solution containing a reducing agent; and
   a precipitation step of allowing reaction between the first reaction solution and the second reaction solutions to obtain silver particles to prepare the silver powder,
   wherein the content of the phosphorous compound and a reaction temperature for the precipitation step are adjusted to control a shrinkage rate of the silver powder to a range from 5% to 20% at 500° C.,
   wherein in the reaction solution preparation step, the phosphorous compound is added in a ratio of 0.02% to 0.06% by weight with respect to the total weight of the first reaction solution, and
   wherein in the precipitation step, the reaction temperature is adjusted to be in a range of 15° C. to 35° ° C.

2. The method according to claim 1, wherein the phosphorus compound is at least one selected from the group consisting of sodium pyrophosphate, potassium phosphate, and metaphosphate.

3. A silver powder preparation method comprising a silver salt reduction step comprising:
   a reaction solution preparation step of preparing a first reaction solution containing silver ions, ammonia, an alkali metal salt of an organic acid, and a phosphorous compound, and a second reaction solution containing a reducing agent; and
   a precipitation step of allowing reaction between the first reaction solution and the second reaction solutions to obtain silver particles to prepare the silver powder,
   wherein the content of the phosphorous compound is adjusted by adding the phosphorous compound in a ratio of 0.02% to 0.06% by weight with respect to the total weight of the first reaction solution in the reaction solution preparation step, and a reaction temperature for the precipitation step is adjusted to be in a range of 15° C. to 35° C. in the precipitation step.

* * * * *